US 011747997B2

(12) United States Patent
Gahlot et al.

(10) Patent No.: US 11,747,997 B2
(45) Date of Patent: Sep. 5, 2023

(54) METHOD AND APPARATUS FOR PROVIDING DIFFERENTIATED SHARE PRIORITIZATION IN A STORAGE SYSTEM

(71) Applicant: EMC IP HOLDING COMPANY LLC, Hopkinton, MA (US)

(72) Inventors: Jai Gahlot, Pune (IN); Shiv Kumar, Pune (IN); Amit Chauhan, Pune (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/237,120

(22) Filed: Apr. 22, 2021

(65) Prior Publication Data
US 2022/0342565 A1 Oct. 27, 2022

(51) Int. Cl.
*G06F 13/18* (2006.01)
*G06F 3/06* (2006.01)

(52) U.S. Cl.
CPC ............ *G06F 3/0622* (2013.01); *G06F 3/067* (2013.01); *G06F 3/0655* (2013.01)

(58) Field of Classification Search
CPC ...... G06F 3/061; G06F 3/0611; G06F 3/0613; G06F 3/062; G06F 3/0622; G06F 3/0623; G06F 3/0655; G06F 3/0659; G06F 3/067; G06F 13/18; G06F 13/26; G06F 13/30; G06F 13/34; G06F 13/372; G06F 13/374
USPC ........ 710/40–45, 74; 711/151, 158; 718/103
See application file for complete search history.

(56) References Cited

U.S. PATENT DOCUMENTS

| 8,812,744 | B1* | 8/2014 | Iyigun | G06F 3/0685 710/5 |
| 9,928,183 | B2* | 3/2018 | Svendsen | G06F 13/18 |
| 2005/0257013 | A1* | 11/2005 | Ma | G06F 3/061 711/158 |
| 2012/0240112 | A1* | 9/2012 | Nishiguchi | G06F 9/45558 718/1 |
| 2016/0188246 | A1* | 6/2016 | Makida | G06F 3/0659 711/158 |
| 2021/0200579 | A1* | 7/2021 | Li | G06F 9/466 |
| 2022/0075527 | A1* | 3/2022 | Ben Dayan | G06F 3/067 |

* cited by examiner

*Primary Examiner* — Ilwoo Park
(74) *Attorney, Agent, or Firm* — Anderson Gorecki LLP

(57) ABSTRACT

A Software Defined Network Attached Storage (SDNAS) executes on a storage system to provide access to shared file systems, referred to as "shares", on the storage system. Users access the shares using protocol clients. To enable the SDNAS to provide differentiated prioritization between the various shares, a share priority table is maintained by the SDNAS. As shares are created, or optionally after the shares have been created, each share is assigned a share priority which is stored in the share priority table. When an IO operation is received from a protocol client on a share, the SDNAS process determines a share priority value of the share from the share priority table. The share priority value is used to specify an IO priority which used by the operating system scheduling mechanism to schedule the IO operation and to establish a CPU priority for the IO operation.

20 Claims, 4 Drawing Sheets

FIG. 3

| Share Priority Table 210 | | | |
|---|---|---|---|
| Share ID 305 | Share Name 310 | Share Path 315 | Share Priority 320 |
| SID0001 | Oracle App Data | /vo10/data/oracle_data | 0 |
| SID0008 | Concert Raw | /vo16/users/userid/concert/raw_videos | 56 |
| ••• | ••• | ••• | ••• |
| SID1132 | SQL db | /vo33/msft/sqldb | 10 |

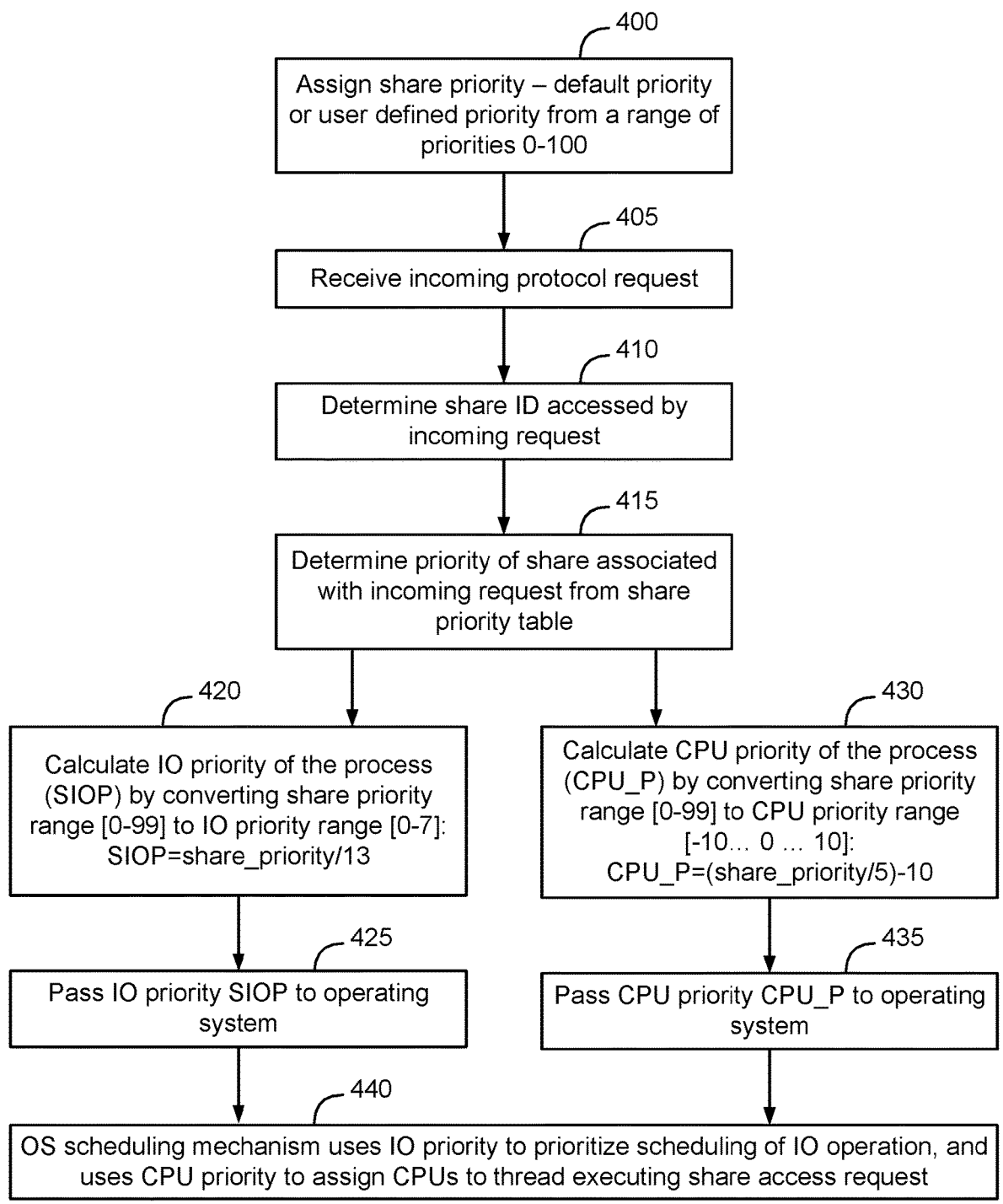

METHOD AND APPARATUS FOR PROVIDING DIFFERENTIATED SHARE PRIORITIZATION IN A STORAGE SYSTEM

FIELD

This disclosure relates to computing systems and related devices and methods, and, more particularly, to a method and apparatus for providing differentiated share prioritization in a storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A Software Defined Network Attached Storage (SDNAS) process executes on a storage system to provide access to shared file systems, referred to herein as "shares", maintained by the storage system. Users access the shares using protocol clients. To enable the SDNAS to provide differentiated prioritization between the various shares, a share priority table is maintained by the SDNAS. The share priority table may be specific to the SDNAS process, or commonly accessed by multiple SDNAS processes. As shares are created, or optionally after the shares have been created, each share is assigned a share priority which is stored in the share priority table. When an IO operation is received from a protocol client on a share, the SDNAS process determines a share priority value of the share from the share priority table. The share priority value is used to specify an IO priority which is transmitted to the storage system operating system, and used by the operating system scheduling mechanism to differentiate prioritization between IO operations on different shares. The share priority value is also used to adjust the CPU priority of the IO operation.

BRIEF DESCRIPTION OF THE DRAWINGS

FIG. 3 is a functional block diagram of an example data structure configured to implement a share priority table for use by the software defined network attached storage processes to provide differentiated share prioritization in a storage system, according to some embodiments.

FIG. 4 is a flow chart of an example method of providing differentiated share prioritization in a storage system, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
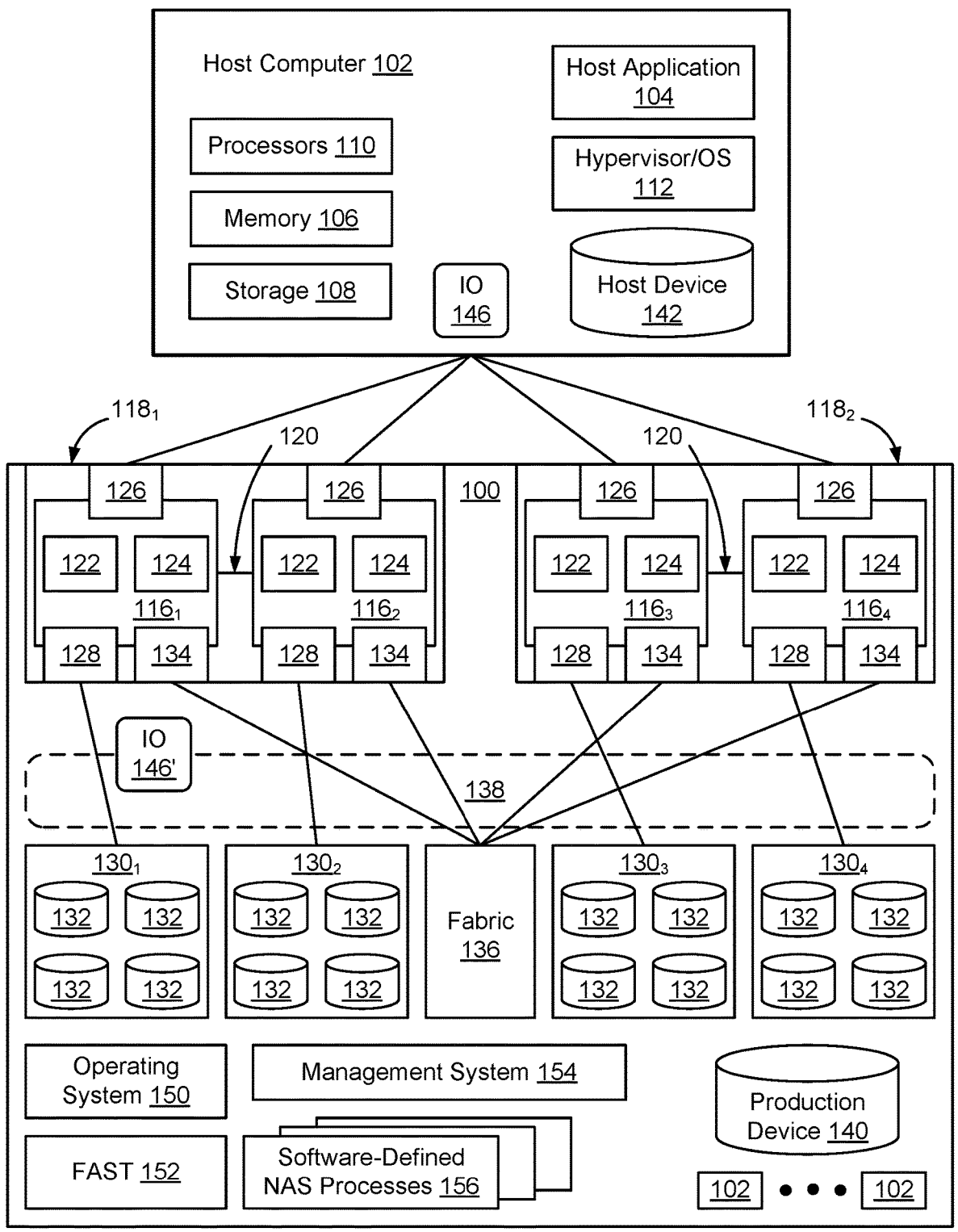
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

As shown in FIG. 1, a host application 104 may access storage resources provided by one or more storage systems 100 over a communication network. In some embodiments, the communication network is an Internet Protocol (IP) communication network enabling transmission of IP data packets through the communication network. Data from the host application 104 is stored in the storage resources 130 of the storage system 100. Storage resources that are accessed by a host application 104 over a communication network are referred to herein as Network Attached Storage (NAS). In some embodiments, the storage resources of a storage system 100 are abstracted to the host application 104 by software applications referred to herein as "Software Defined Network Attached Storage (SDNAS) applications." For example, as shown in FIG. 1, in some embodiments, the storage system 100 includes one or more software defined network attached storage processes 156 executing on the storage system, for example in emulations implemented on the storage system 100. A given SDNAS application may, in some embodiments, be implemented as a Virtual Network Attached Storage (VNAS) server.

Figure 2:
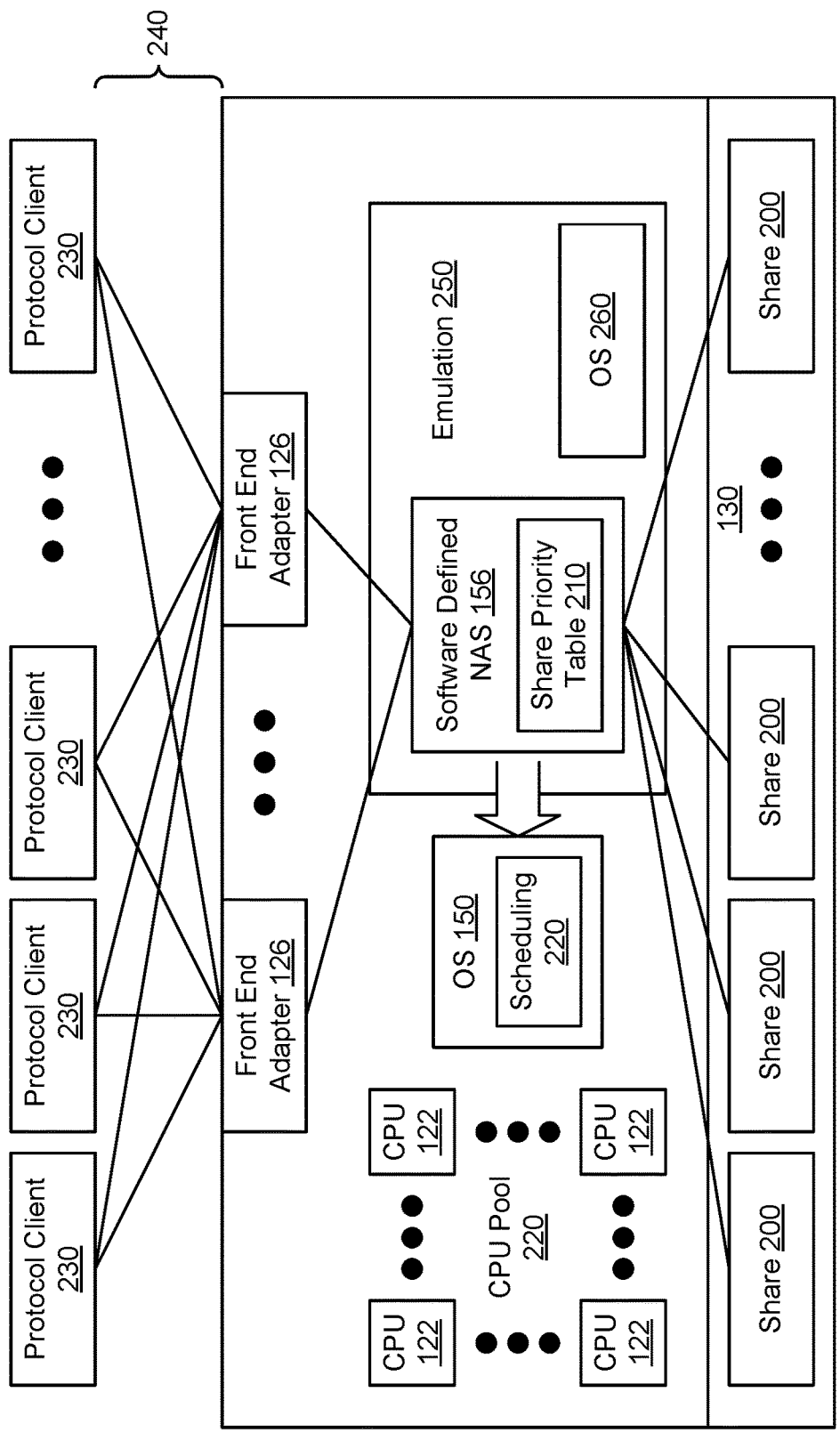
FIG. 2 is a functional block diagram of a storage system having a software defined network attached storage process configured to provide differentiated share prioritization in a storage system, according to some embodiments.

FIG. 2 is a functional block diagram of a storage system having a software defined network attached storage process 156 configured to provide differentiated share prioritization in a storage system, according to some embodiments. As shown in FIG. 2, the storage system 100 has physical resources including a number of CPU processor cores 122, storage resources 130, and other physical resources. A hypervisor abstracts the physical resources of the storage system 100 from emulations 250, and allocates physical resources of storage system 100 for use by the emulations 250.

Each emulation 250 has an operating system 260 and one or more application processes running in the context of the operating system 260. As shown in FIG. 2, in some embodiments, one or more of the emulations 250 instantiated on storage system 100 implements one or more SDNAS processes 156 to provide access to shares 200 stored in storage resources 130.

The SDNAS processes 156 allow customers to enable file sharing on the storage system 100. Shared file systems are commonly referred to as "shares" or "exports," depending on the type of underlying operating system 150. For simplicity, as used herein, the term "share" 200 will be used to refer to a shared file system that is accessible at a network address exposed on the storage system 100, and is not intended to connote the use of any particular underlying operating system.

Shares 200 are accessed by protocol clients 230. Example protocol clients include Windows SMB (Server Message Block) clients, Unix NFS (Network File System) clients, HDFS (Hadoop Distributed File System) clients, HTTP (HyperText Transfer Protocol) clients, or other types of clients. While an example will be provided focusing on SMB/NFS clients, other types of clients may similarly be used to access shares 200. Example protocol clients 230 may be, for example Oracle on NFS, Vmware on NFS, Microsoft SQL on SMB 3.0, etc.

The SDNAS process 156 generally exposes may shares 200. Protocol clients 230 can simultaneously connect to these shares 200, and conventionally have fairly/equally shared access to the SDNAS 156, when requesting access to the set of shares 200 supported by the SDNAS 156. Unfortunately, there are situations where it would be advantageous to enable one of the protocol clients 230 accessing a particular share to have priority over other protocol clients 230 accessing other shares. For example, the network administrator responsible for managing operation of the storage system 100 may prefer that an Oracle/NFS protocol client should receive higher rates of data transfer than a Vmware/NFS protocol client, or than the SDNAS 156 provides to a person who has selected to download a movie. While the underlying storage system 100 may have various ways of prioritizing IO operations, for example by prioritizing access operations to particular regions of storage resources 130, the SDNAS 156 is not able to implement this on a per-share basis, or on a per-protocol client basis. Stated differently, conventionally the SDNAS process 156 did not have a way to distinguish which application is requesting access to a particular share, and therefore the SDNAS 156 could not be used to prioritize operations between protocol clients 230.

According to some embodiments, as shown in FIG. 2, the SDNAS process 156 is configured to implement a share priority table 210. An example share priority table 210 is shown in FIG. 3, and is discussed in greater detail below.

The share priority table 210 enables priorities for the shares 200 exposed by a SDNAS process 156 to be established. When a protocol client 230 accesses a share 200, the SDNAS process 156 determines the share priority from the share priority table 210, and uses the share priorities of the various shares 200 to provide differential access to different shares 200 exposed by the SDNAS 156.

The share-based priority mechanism gives better IO performance for protocol clients 230 to higher priority shares 200, as compared to protocol clients 230 connecting to lower priority shares 200. The differentiation is made at the level of the shares 200, so that a protocol client 230 requesting data transfer from a higher priority share will be given higher priority than a protocol client 230 requesting data transfer from a lower priority share. By differentiating between shares 230, and enabling priority to be set on a per-share basis, it is possible to give preferential treatment to protocol clients accessing different shares 200. This enables the SDNAS process 156 to give better throughput for mission critical applications, and provide better user experience for premium users.

Since certain shares 200 will only be accessed by particular protocol clients, enabling per-share prioritization at the SDNAS 156 also enables the SDNAS to effectively differentiate between access operations by different protocol clients. For example, a protocol client 230 with a lower subscription level may be allowed to create shares on the SDNAS and assign priority values to the shares from a lower priority range, while a protocol client 230 with a higher subscription level and hence a higher storage system management system privilege may be allowed to create shares on the SDNAS process 156 and be given permission to assign priority values to the shares 200 from a higher priority range. By differentiating share priorities, and tying the ability to set share priority levels to protocol client 230 access subscription level, it becomes possible to encourage protocol clients 230 to acquire higher subscription access levels. Further, since the share priorities are able to be adjusted over time, enabling use of a share priority table 210 to differentiate access to the shares 200 enables the share priorities to dynamically adapt over time.

FIG. 3 is a functional block diagram of an example data structure configured to implement a share priority table 210 for use by the software defined network attached storage processes 156 to provide differentiated share 200 prioritization in a storage system 100, according to some embodiments. As shown in FIG. 3, in some embodiments the share priority table 210 contains entries (rows in FIG. 3) for each of the shares that is to have its access priority managed by the SDNAS 156. In some embodiments, each entry identifies the share 200 by share ID 305, share name 310, and share path 315. In some embodiments, the share ID 305 and share name 310 are used to identify the share on the storage system management system 154. The share path 315 is the path (logical address) on the storage system where the share is stored. For example, the share priority table 210 shown in FIG. 3 contains a first entry for share ID SID0001, which has been given a share name "Oracle App Data". The share path for this share is /vol0/data/oracle_data, which tells the SDNAS 156 where to find the data for the share 200. The particular manner that the actual data access operations on storage resources 130 occur will depend on the particular implementation.

In some embodiments, the shares are given priority values in the range of between 0-99, although other ranges may be used as well depending on the implementation. In this description, lower share priority values correspond to higher SDNAS access priority, and higher share priority values correspond to lower SDNAS access priority. Thus, using this scale, a share priority value of "0" is the highest possible access priority value, and a share priority value of "99" is the lowest possible access priority value. However, the opposite convention could similarly be adopted depending on the implementation.

In some embodiments, users create shares using the storage system management system 154 (see FIG. 1). When creating a share, the user selects the file path that is to be associated with the share and gives the share a name 310. The share ID 305 may be automatically generated by the SDNAS process 156, depending on the implementation. To enable shares 200 to be assigned priority values 320, in some embodiments the storage system management system 154 also enables the user to specify a share priority when creating the share 200. If no share priority value 320 is specified, the SDNAS process 156 may assign a default priority to the share, such as a default value of 50. At a later date, the user may go in to modify the share priority values 320 to set a custom value for the share 200 according to the user's preference.

In some embodiments, the SDNAS process 156 uses the share priorities 320 in the share priority table 210 to assign IO priorities for share IO requests from protocol clients 230. For example, the priorities of the shares 200 can be used by the SDNAS process 156 to change IO priority of the request context on the storage system 100.

The particular manner in which IO priorities are implemented will depend on the underlying technology used to implement IO operations on the storage system 100. As an example, if the operating system 150 used by storage system 100 is based on Linux, Linux has the notion of IO priority and this underlying capability can be exploited by the SDNAS 156 to differentiate share access IO operations on different shares. For example, if the Linux operating system has 8 levels of IO priority (labeled 0-7 with 0 being the highest priority), the share priorities contained in the share priority table 210 may be converted into 8 ranges and used to specify, to the OS 150, which priority level the OS 150 should use when handling a particular request.

In an example where share priorities are set from a scale of 0-99, and the OS allows for 8 System IO Priority (SIOP) IO priority levels (range of 0-7), the share priorities 320 from the share priority table 210 may be converted using the following algorithm: System Priority=share priority/13. When the SDNAS sends the IO to the OS, the SDNAS will include the system priority value with the IO operation, to thus enable the OS 150 to provide differentiated prioritization to IO operations on different shares 200. This enables the SDNAS 156 to achieve varying IO bandwidth for different protocol clients 230 accessing different shares 200.

It is also possible to use the share priorities 320 to adjust CPU priorities. For example, the Linux scheduling mechanism uses 140 CPU priority levels. Generally Linux priority levels 0-99 are used for real-time processes and Linux priority levels 100-139 are used for normal (e.g. user) processes. In some embodiments, the SDNAS process 156 maps the share priorities 320 into a range of Linux process priority levels. For example, assume that the SDNAS 156 would like the Linux scheduling mechanism to assign share access operations in a range centered at 40, with a variation of +/−10. To do this, the share priority values from the table can be divided into 20 ranges [−10 . . . 0 . . . +10], where −10 is the highest priority, for example using the following equation: share_cpu_priority=(share_priority/5)−10. This share_cpu_priority is then added to the range center value (40 in this example) to cause the priority values 320 specified in the share priority table 210 to be used by the Linux scheduling mechanism to differentially prioritize execution of different share access operations on the CPUs 122 of the storage system 100. Although a particular method of mapping the share priority values 320 from the share priority table 210 to a CPU scheduling mechanism was provided, it should be realized that other mappings could likewise be utilized depending on the implementation.

FIG. 4 is a flow chart of an example method of providing differentiated share prioritization in a storage system, according to some embodiments. As shown in FIG. 4, shares 200 are assigned share priority values 320, either manually for example when a share is created or modified, or by default (block 400). Share priority values 320 may be assigned from a share priority range, for example from 0-99, or using some other predetermined share priority range.

In some embodiments, the range of share priorities that a user is allowed to assign to a particular share may be based on a privilege level associated with the user, for example a permission level or subscription level of the user. For example, if the SDNAS enables share priority values in a range of 0-99, with 0 being the highest priority, a user with a high value subscription may be allowed to assign shares share priority values using the entire range (0-99). By contrast, a user with a lower value subscription may be restricted and only allowed to assign shares share priority values using a range of between 50-99. By restricting the ability of the lower value subscription to assign higher priority share access values, it is possible to provide differential access to users with different subscription levels on the SDNAS process 156.

When an incoming share access is received by the SDNAS 156 from a protocol client 230 (block 405), the SDNAS will identify the share associated with the share access request (block 410) and use the share ID or other information from the share access request to determine the share priority from the share priority table 210 (block 415).

The SDNAS 156 will then calculate an IO priority for the request by converting the share priority 320 to the IO priority range supported by the storage system operating system (block 420). For example, if the range of share priorities 320 in the share priority table 210 extends from 0-99, and the IO priority range supported by the scheduling mechanism of the storage system OS is from 0-7, the share priority 320 is converted to select a system priority (SIOP) between 0-7. In addition, or alternatively depending on the implementation, in some embodiments the SDNAS 156 calculates the CPU priority of the process (CPU_P) by converting the share priority range to a range of CPU priorities (block 430).

The IO priority (SIOP) and the CPU priority CPU_P scores are passed by the SDNAS 156 to the OS 150 when the SDNAS submits the share access request to the OS 150 for implementation (blocks 425, 435). The OS scheduling mechanism uses IO priority to prioritize scheduling of IO operation, and uses CPU priority to assign CPUs to the thread implementing the share access request (block 440).

By providing differentiated share prioritization, it becomes possible for a system administrator to directly specify priority variations between different shares. This provides flexibility for the system administrator to directly specify which of the shares should be handled with high priority on the storage system, and which of the shares should be handled with lower priority on the storage system. In turn, these share priority values are used by the SDNAS process 156 to specify to the storage system operating system 150 how to prioritize particular share access requests, so that the operating system 150 can schedule the share access requests and allocate CPU resources to the threads executing the share access requests in a differentiated manner, as controlled by the system administrator, without requiring the system administrator to adjust underlying operation of the storage system itself.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of providing differentiated share prioritization in a storage system, the computer program including a set of instructions which, when executed by a computer, cause the computer to perform a method comprising the steps of:
   instantiating a Software Defined Network Attached Storage (SDNAS) process on a storage system, the storage system having an operating system configured to receive share access requests from the SDNAS process, retrieve data from physical storage resources in response to the share access requests from the SDNAS process, and return the data to the SDNAS process;
   exposing shares by the SDNAS process to protocol clients;
   maintaining a share priority table, by the SDNAS process, the share priority table correlating share priority values with the exposed shares, wherein the share priority values include a plurality of different share priority values;
   receiving share access requests, by the SDNAS process, from protocol clients on the shares exposed by the SDNAS process;
   determining a respective share priority value associated with each respective share access request, by the SDNAS process, from the share priority table;
   determining a respective operating system IO priority value from the determined respective share priority value;
   determining a respective CPU scheduling priority value from the determined respective share priority value;
   adding the determined respective operating system IO priority value and CPU scheduling priority value to each respective share access request, by the SDNAS process, prior to passing the respective share access request to the operating system of the storage system; and
   passing each respective share access request from the SDNAS process to the operating system of the storage system, each respective share access request including the respective operating system IO priority value and the respective CPU scheduling priority value to specify the priority to be used by the operating system to prioritize implementation of the respective share access request relative to other storage access operations in connection with retrieving data associated with the respective share access request from the physical storage resources and returning the data associated with the respective share access request to the SDNAS process; and
   responding to the share access requests, by the SDNAS process, by forwarding the returned data associated with the respective share access requests to the protocol clients.

2. The non-transitory tangible computer readable storage medium of claim 1, further comprising implementing each respective share access request, by the operating system on the storage system.

3. The non-transitory tangible computer readable storage medium of claim 2, wherein the step of implementing each respective share access request comprises using the respective operating system IO priority value and the respective CPU scheduling priority value, by a scheduling mechanism of the operating system, to set a priority of scheduling of the respective share access request relative to the other storage access operations and to determine a CPU assignment to a thread associated with the respective share access request.

4. The non-transitory tangible computer readable storage medium of claim 3, wherein the respective operating system IO priority value is specific to the respective share access request and configured to be used by the operating system to prioritize IO operations for execution on the storage system.

5. The non-transitory tangible computer readable storage medium of claim 3, wherein the respective CPU scheduling priority value is specific to the respective share access request and configured to adjust an amount of CPU cycles provided to a thread assigned to implement the respective share access request on the CPU.

6. The non-transitory tangible computer readable storage medium of claim 1, further comprising receiving the share priority values, by the SDNAS process, from a share management system.

7. The non-transitory tangible computer readable storage medium of claim 6, wherein receiving the share priority values comprises differentiating between share management system privileges by restricting share priority value ranges according to the share management system privileges.

8. The non-transitory tangible computer readable storage medium of claim 7, wherein differentiating between share management system privileges comprises providing higher share priority value ranges to enable higher share management system privileges with access to higher share priority values.

9. The non-transitory tangible computer readable storage medium of claim 7, wherein differentiating between share management system privileges comprises providing only lower share priority value ranges to restrict lower share management system privileges to accessing only the lower share priority values.

10. The non-transitory tangible computer readable storage medium of claim 6, wherein receiving the share priority values comprises differentiating between share management system user privileges by allocating share priority value ranges according to share management user share access subscription levels.

11. A method of providing differentiated share prioritization in a storage system comprising the steps of:
instantiating a Software Defined Network Attached Storage (SDNAS) process on a storage system, the storage system having an operating system configured to receive share access requests from the SDNAS process, retrieve data from physical storage resources in response to the share access requests from the SDNAS process, and return the data to the SDNAS process;
exposing shares by the SDNAS process to protocol clients;
maintaining a share priority table, by the SDNAS process, the share priority table correlating share priority values with the exposed shares, wherein the share priority values include a plurality of different share priority values;
receiving share access requests, by the SDNAS process, from protocol clients on the shares exposed by the SDNAS process;
determining a respective share priority value associated with each respective share access request, by the SDNAS process, from the share priority table;
determining a respective operating system IO priority value from the determined respective share priority value;
determining a respective CPU scheduling priority value from the determined respective share priority value;
adding the determined respective operating system IO priority value and CPU scheduling priority value to each respective share access request, by the SDNAS process, prior to passing the respective share access request to the operating system of the storage system; and
passing each respective share access request from the SDNAS process to the operating system of the storage system, each respective share access request including the respective operating system IO priority value and the respective CPU scheduling priority value to specify the priority to be used by the operating system to prioritize implementation of the respective share access request relative to other storage access operations in connection with retrieving data associated with the respective share access request from the physical storage resources and returning the data associated with the respective share access request to the SDNAS process; and
responding to the share access requests, by the SDNAS process, by forwarding the returned data associated with the respective share access requests to the protocol clients.

12. The method of claim 11, further comprising implementing each respective share access request, by the operating system on the storage system.

13. The method of claim 12, wherein the step of implementing each respective share access request comprises using the respective operating system IO priority value and the respective CPU scheduling priority value, by a scheduling mechanism of the operating system, to set a priority of scheduling of the respective share access request relative to the other storage access operations and to determine a CPU assignment to a thread associated with the respective share access request.

14. The method of claim 13, wherein the respective operating system IO priority value is specific to the respective share access request and configured to be used by the operating system to prioritize IO operations for execution on the storage system.

15. The method of claim 13, wherein the respective CPU scheduling priority value is specific to the respective share access request and configured to adjust an amount of CPU cycles provided to a thread assigned to implement the respective share access request on the CPU.

16. The method of claim 11, further comprising receiving the share priority values, by the SDNAS process, from a share management system.

17. The method of claim 16, wherein receiving the share priority values comprises differentiating between share management system privileges by restricting share priority value ranges according to the share management system privileges.

18. The method of claim 17, wherein differentiating between share management system privileges comprises providing higher share priority value ranges to enable higher share management system privileges with access to higher share priority values.

19. The method of claim 17, wherein differentiating between share management system privileges comprises providing only lower share priority value ranges to restrict lower share management system privileges to accessing only the lower share priority values.

20. The method of claim 16, wherein receiving the share priority values comprises differentiating between share management system user privileges by allocating share priority value ranges according to share management user share access subscription levels.

* * * * *